(12) United States Patent
Takahashi (10) Patent No.: US 11,758,065 B2
(45) Date of Patent: Sep. 12, 2023

(54) IMAGE FORMING APPARATUS

(71) Applicant: CANON KABUSHIKI KAISHA, Tokyo (JP)

(72) Inventor: Hiroyuki Takahashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/830,594

(22) Filed: Jun. 2, 2022

(65) Prior Publication Data

US 2022/0394147 A1    Dec. 8, 2022

(30) Foreign Application Priority Data

Jun. 7, 2021 (JP) ................ 2021-094954

(51) Int. Cl.
  *H04N 1/00* (2006.01)
  *H04N 1/60* (2006.01)

(52) U.S. Cl.
  CPC ..... *H04N 1/00779* (2013.01); *H04N 1/00034* (2013.01); *H04N 1/00087* (2013.01);
  (Continued)

(58) Field of Classification Search
  CPC .... G06F 3/1205; G06F 3/1256; G06F 3/1275; G06F 3/1285; G01J 2003/425; G01J 3/42; G01J 3/50; G01J 3/502; G03G 15/5016; G03G 15/5025; G03G 15/5062; G03G 21/1647; G03G 2215/00616; G03G 2215/0158; G03G 15/1675; G03G 15/2028; G03G 15/50; G03G 15/5029; G03G 15/657; G03G 15/6573; G03G 15/6576; G03G 2215/0043; H04N 1/00018; H04N 1/00023; H04N 1/00204; H04N 1/00244; H04N 1/00432; H04N 1/00472; H04N 1/00474; H04N 1/00482; H04N 1/00567;
  (Continued)

(56) References Cited

U.S. PATENT DOCUMENTS

2008/0157465 A1* 7/2008 Matsumoto ............ B65H 5/062
                                              271/277
2012/0236572 A1* 9/2012 Negley ................ F21V 3/0625
                                              362/355
(Continued)

FOREIGN PATENT DOCUMENTS

JP        2013054324 A      3/2013
JP        2019171726 A     10/2019

*Primary Examiner* — Negussie Worku
(74) *Attorney, Agent, or Firm* — ROSSI, KIMMS & McDOWELL LLP (57) ABSTRACT

An image forming apparatus includes: an image forming unit configured to form an image onto a sheet; a conveyance roller configured to convey the sheet through a conveyance path, the conveyance path including a curved path being bent; a sensor configured to read the image formed on the sheet conveyed through the conveyance path by the conveyance roller, the sensor being configured to read the image formed on the sheet when a part of the sheet is conveyed through the curved path; and a controller configured to obtain information related to a type of the sheet, and to control, based on the information, a conveying speed of the sheet conveyed by the conveyance roller when the sensor reads the image.

13 Claims, 8 Drawing Sheets

(52) U.S. Cl.
CPC ..... *H04N 1/00602* (2013.01); *H04N 1/00724* (2013.01); *H04N 1/00726* (2013.01); *H04N 1/6033* (2013.01)

(58) Field of Classification Search
CPC .......... H04N 1/00639; H04N 1/00641; H04N 1/00649; H04N 1/00657; H04N 1/32358; H04N 2201/0039; H04N 2201/0094; H04N 2201/3242; H04N 2201/3274
USPC .......................................................... 358/3.2
See application file for complete search history.

(56) References Cited

U.S. PATENT DOCUMENTS

| | | | | |
|---|---|---|---|---|
| 2012/0300261 | A1* | 11/2012 | Uehara | B65H 9/002 |
| | | | | 271/226 |
| 2014/0125982 | A1* | 5/2014 | Takemura | G01J 3/52 |
| | | | | 356/421 |
| 2016/0142586 | A1* | 5/2016 | Ishida | H04N 1/0032 |
| | | | | 358/1.12 |
| 2016/0347563 | A1* | 12/2016 | Takuwa | H04N 1/00588 |
| 2017/0183179 | A1* | 6/2017 | Takuwa | B65H 5/062 |
| 2017/0261905 | A1* | 9/2017 | Itabashi | B65H 7/08 |
| 2020/0218187 | A1* | 7/2020 | Takahashi | G03G 15/5016 |
| 2021/0306497 | A1* | 9/2021 | Tokuma | H04N 1/00713 |
| 2021/0360116 | A1* | 11/2021 | Nagata | G03G 15/5062 |

* cited by examiner

| TYPE OF SHEET | CONVEYING-SPEED SET VALUE (WITH RESPECT TO PLAIN PAPER) |
|---|---|
| PLAIN PAPER | 0% |
| THICK PAPER | +0.5% |
| EXTRA THICK PAPER | +0.9% |
| COATED PAPER | −0.2% |
| THICK COATED PAPER | +0.1% |

| TYPE OF SHEET | CONVEYING-SPEED SET VALUE | DRIVE FREQUENCY: F[pps] |
|---|---|---|
| PLAIN PAPER | S1=0% | F1=F0*(100+S1+Ni)/100 |
| THICK PAPER | S2=+0.5% | F2=F0*(100+S2+Ni)/100 |
| EXTRA THICK PAPER | S3=+0.9% | F3=F0*(100+S3+Ni)/100 |
| COATED PAPER | S4=-0.2% | F4=F0*(100+S4+Ni)/100 |
| THICK COATED PAPER | S5=+0.1% | F5=F0*(100+S5+Ni)/100 |

FIG. 10A

| ADJUSTMENT VALUE OF EACH NUMBER OF PASSED SHEETS: Ni |
|---|
| Ni=+0%(N<TEN THOUSAND SHEETS) |
| Ni=+0.3%(TEN THOUSAND SHEETS≦N<TWO HUNDRED THOUSAND SHEETS) |
| Ni=+0.8%(TWO HUNDRED THOUSAND SHEETS≦N<TWO MILLION SHEETS) |
| Ni=+1.5%(TWO MILLION SHEETS≦N<SIX MILLION SHEETS) |
| Ni=+2.5%(SIX MILLION SHEETS≦N<TWELVE MILLION SHEETS) |

FIG. 10B

IMAGE FORMING APPARATUS

BACKGROUND OF THE INVENTION

Field of the Invention

The present disclosure relates to an image forming apparatus, for example, a copying machine, a multifunction peripheral, or a printer.

Description of the Related Art

In recent years, the market for on-demand image forming apparatus is expanding. For example, in an offset printing market, electrophotographic image forming apparatus are becoming widespread. Further, image forming apparatus employing an inkjet system have been successful in cultivating a wide market for reasons such as a large format, a low initial cost, and an extremely high speed. However, expansion of the market is not easy, and quality of images (hereinafter referred to as "image quality") of preceding image forming apparatus that have served the market must be maintained. In order to maintain the image quality, an image forming condition to be used when the image forming apparatus forms an image onto a sheet is appropriately corrected.

The quality includes a tone characteristic, granularity, in-plane evenness, letter quality, and color reproducibility (including color stability), for example. It is said that the most important of those is the color reproducibility. A human has memories of empirically expected colors (in particular, human skin, sky, and metal, for example), and feels uncomfortable about colors that deviate this allowed range of memory in some cases. Such colors of memory are called "memory colors." Reproducibility of the memory colors is important when a picture or the like is output. In addition, a group of office users who feel uncomfortable about a difference in color between a printed business document and a monitor, and a group of graphic arts users who deal with computer graphics have high demand for color reproducibility including stability of the on-demand image forming apparatus.

The color reproducibility also has a problem of color difference not only between apparatus of the same model, but also between apparatus of different models, between image forming apparatus employing different systems, or between an image forming apparatus and an image display apparatus, for example, a display. In order to perform color matching between those apparatus, software and a colorimeter for creating a multidimensional look-up table (LUT) called an international color consortium (ICC) profile are available. Professional users may create an ICC profile of a printer and an ICC profile of an offset printing machine to construct a color management environment. As a result, the color to be output by the printer is allowed to be matched with the color to be printed by the offset printing machine, and hence the printer can be used for color calibration of the offset printing machine or for printing of a small number of copies.

The contents of the ICC profile of the offset printing machine and the ICC profile of the printer are calibrated in association with a color space independent of the printing machine or the printer, based on results of measuring colors of a test chart through use of the colorimeter. The test chart is formed of a combination of a plurality of test images. The color space is, for example, a CIE L*a*b* color space (CIE stands for Commission International d'Eclairage). In this manner, the color to be printed by the printing machine and the color to be printed by the printer are allowed to be matched with each other. A color management module (CMM) can create print data by performing color conversion through use of those ICC profiles.

As described above, color management environments such as a colorimeter, applications, and profile creation software are ready. However, an offline colorimeter takes time to measure colors. Further, the environments have issues in, for example, creation of the ICC profile, uploading the ICC profile to the printer or the like, and effective usage of the uploaded ICC profile, and are not popular to general users. In order to increase the speed of the color measurement, create the ICC profile easily, and automate the setting work, there has been provided an image forming apparatus including an inline colorimeter installed in the vicinity of a sheet discharge portion of the printer.

In Japanese Patent Application Laid-open No. 2019-171726 and Japanese Patent Application Laid-open No. 2013-54324, there is disclosed an image forming apparatus including a reading unit (measuring unit) for reading an image printed on a sheet being conveyed. The image forming apparatus is required to suppress variations of a conveying speed of a sheet being a reading target as small as possible, and accurately read, by the reading unit, a test chart printed in a limited range on the sheet. The image forming condition such as an image density or an image geometrical characteristic is corrected based on reading results of the test chart.

There are a wide variety of types of sheets to be used by the user. In order to satisfy the standards of hues that are different among countries, color measurement results of a large number of test images are required. In order to reduce the number of sheets to be consumed by forming the test images onto the sheet, it is required to reduce the size of the test image and print a larger number of test images onto one sheet. However, when the size of the test image is reduced, the test image cannot be accurately read unless the conveying speed at the time of conveying the sheet is stabilized.

The conveying speed becomes unstable when a conveyance path for conveying the sheet to the reading unit is bent (bent path). For example, a conveying speed of thick paper passing through a bent path becomes slower than that of plain paper passing through the same bent path. This is because the thick paper has a larger thickness and a higher stiffness as compared to the plain paper, and thus a conveyance resistance of the thick paper is increased. As a result, there is a possibility that the thick paper or a sheet having a high stiffness may be delayed in a passage time of passing through a reading position of the reading unit as compared to the plain paper. Further, also in a case in which, while the reading unit reads test images, a leading edge side of the sheet having the test images formed thereon enters the bent path, similarly, the passage time of the sheet having the test images formed thereon varies depending on a paper type of the sheet. Accordingly, when the reading unit reads the test chart formed on the sheet passing through the bent path, a color of a position different from the expected test image may be measured. This situation may cause reading failure of the test chart.

SUMMARY OF THE INVENTION

An image forming apparatus according to the present disclosure includes: an image forming unit configured to form an image onto a sheet; a conveyance roller configured to convey the sheet through a conveyance path, the conveyance path including a curved path being bent; a sensor configured to read the image formed on the sheet conveyed through the conveyance path by the conveyance roller, the sensor being configured to read the image formed on the sheet when a part of the sheet is conveyed through the curved path; and a controller configured to obtain information related to a type of the sheet, and to control, based on the information, a conveying speed of the sheet conveyed by the conveyance roller when the sensor reads the image.

Further features of the present invention will become apparent from the following description of exemplary embodiments (with reference to the attached drawings).

DESCRIPTION OF THE EMBODIMENTS

Now, description is given of an embodiment of the present disclosure with reference to the drawings.
<Image Forming Apparatus>

Figure 1:
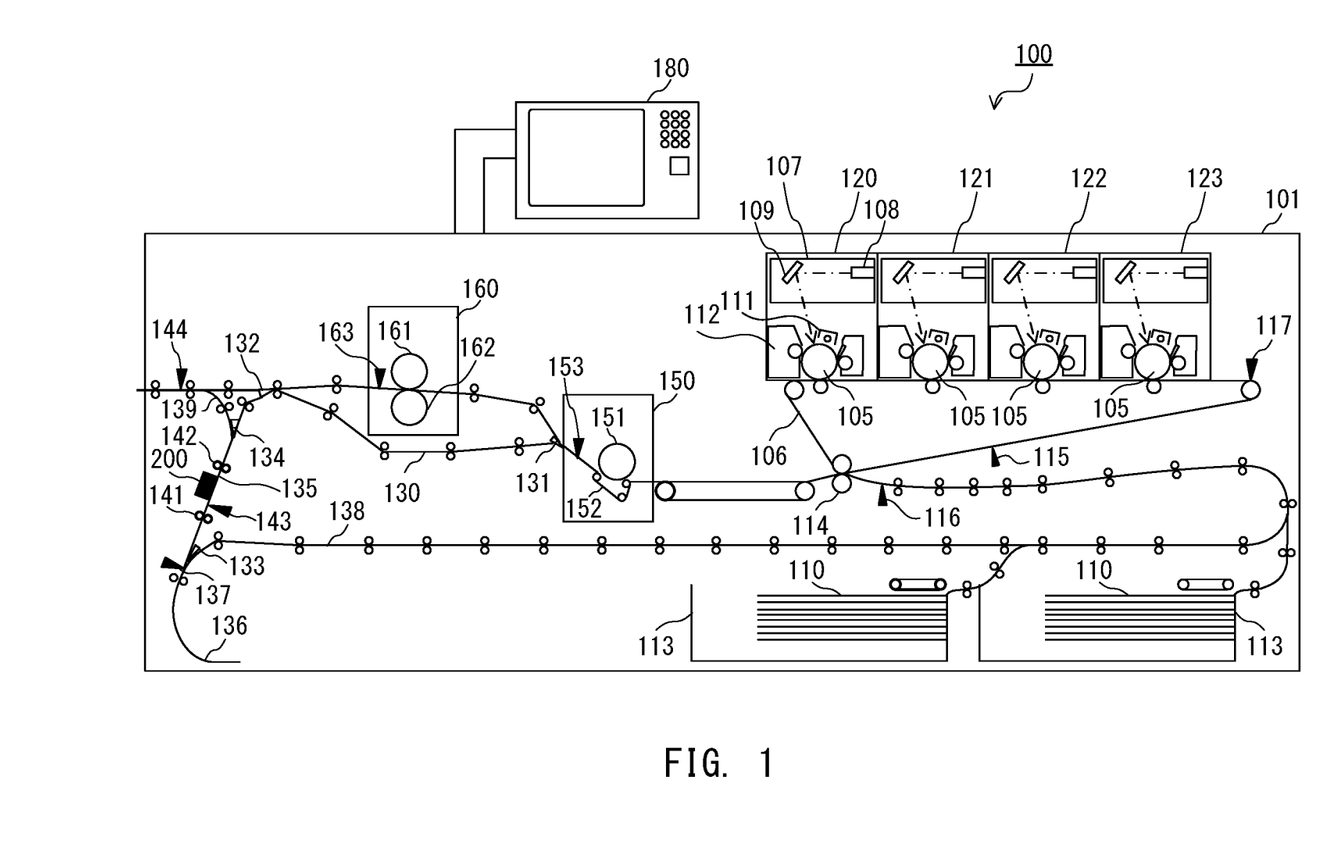
FIG. 1 is a configuration view of an image forming apparatus according to an embodiment of the present disclosure.

FIG. 1 is a configuration view of an image forming apparatus according to this embodiment. An image forming apparatus 100 according to this embodiment employs an electrophotographic system to form an image onto a sheet 110. The image forming apparatus 100 in this embodiment may be an inkjet printer or a dye-sublimation printer.

The image forming apparatus 100 includes, inside a casing 101, mechanisms which form an engine unit for use in image formation, and a controller to be described later. The controller controls the operations of the mechanisms. An operation panel 180 is provided in an upper portion of the casing 101. The operation panel 180 is a user interface, and includes an input device which receives instructions from a user, and an output device which displays a screen such as an operation screen. The mechanisms which form the engine unit include a mechanism (image forming mechanism) for forming an image, a mechanism (transfer mechanism) for transferring the image onto the sheet 110, a mechanism (feeding mechanism) for feeding the sheet 110, and a mechanism (fixing mechanism) for fixing the image to the sheet 110.

The image forming mechanism includes four image forming units 120, 121, 122, and 123 corresponding respective colors of yellow (Y), magenta (M), cyan (C), and black (K). The image forming units 120, 121, 122, and 123 form images of corresponding colors. The image forming units 120, 121, 122, and 123 have the same configuration, but differ only in color of the image to be formed. Description is given here of the configuration of the image forming unit 120, and description of the configurations of the other image forming units 121, 122, and 123 is omitted.

The image forming unit 120 includes a photosensitive drum 105, a charging device 111, a laser scanner 107, and a developing device 112. The photosensitive drum 105 is a drum-shaped photosensitive member, and rotates about a drum shaft. The charging device 111 uniformly charges the surface of the rotating photosensitive drum 105. The laser scanner 107 scans the photosensitive drum 105 with laser light modulated based on image data representing the image to be formed. The laser scanner 107 includes a light emitting portion 108 which scans the laser light emitted from a semiconductor laser in one direction, and a reflective mirror 109 which reflects the laser light emitted from the light emitting portion 108 toward the photosensitive drum 105. A direction in which the laser scanner 107 scans the photosensitive drum 105 (depth direction of FIG. 1) corresponds to a main scanning direction.

When the charged photosensitive drum 105 is scanned with the laser light, an electrostatic latent image corresponding to the image data is formed on its surface. The developing device 112 develops the electrostatic latent image formed on the photosensitive drum 105 with developer. In this manner, a visible image of the electrostatic latent image is formed on the surface of the photosensitive drum 105. On the photosensitive drum 105 of the image forming unit 120, a yellow image is formed. On the photosensitive drum 105 of the image forming unit 121, a magenta image is formed. On the photosensitive drum 105 of the image forming unit 122, a cyan image is formed. On the photosensitive drum 105 of the image forming unit 123, a black image is formed. The photosensitive drum 105 and the developing device 112 are removable from the casing 101.

The transfer mechanism includes an intermediate transfer member 106 and transfer rollers 114. Onto the intermediate transfer member 106, images are sequentially transferred in superimposition from the photosensitive drums 105 of the respective image forming units 120, 121, 122, and 123. In this embodiment, the intermediate transfer member 106 rotates in the clockwise direction of FIG. 1, and images are transferred in order of the image forming unit 120 (yellow), the image forming unit 121 (magenta), the image forming unit 122 (cyan), and the image forming unit 123 (black). An image density detection sensor 117 is provided on the downstream of the image forming unit 123 in the rotating direction of the intermediate transfer member 106. The image density detection sensor 117 detects an image density from an image for image density detection formed on the intermediate transfer member 106.

The images transferred onto the intermediate transfer member 106 are conveyed to reach the transfer rollers 114 as the intermediate transfer member 106 is rotated. An image formation start position detection sensor 115 is provided on the upstream of the transfer rollers 114 in the rotating direction of the intermediate transfer member 106. The image formation start position detection sensor 115 is used to determine a transfer position for transfer onto the sheet 110. The transfer rollers 114 bring the sheet 110 into pressure-contact with the intermediate transfer member 106, and are to be applied with a bias having an opposite characteristic to that of an image formed on the intermediate transfer member 106. Thus, the images are transferred onto the sheet 110 from the intermediate transfer member 106.

The feeding mechanism includes a sheet feeding cassette 113 which stores the sheet 110, a conveyance path through which the sheet 110 is to be fed, and various rollers for conveying the sheet 110 through the conveyance path. The sheet 110 is fed from the sheet feeding cassette 113, conveyed through the conveyance path so that the images are transferred and fixed to be formed thereon, and is discharged to the outside of the casing 101 as a resultant.

Accordingly, the sheet 110 is first fed from the sheet feeding cassette 113, and is then conveyed through the conveyance path to reach the transfer rollers 114. A sheet feeding timing sensor 116 is provided in the middle of the conveyance path from the sheet feeding cassette 113 to the transfer rollers 114. The sheet feeding timing sensor 116 is used to adjust the timing to convey the sheet 110. The timing to convey the sheet 110 to the transfer rollers 114 is adjusted based on the timing at which the image formation start position detection sensor 115 detects the images formed on the intermediate transfer member 106 and the timing at which the sheet feeding timing sensor 116 detects the sheet 110. In this manner, the images are transferred onto a predetermined position of the sheet 110 from the intermediate transfer member 106.

The sheet 110 having the images transferred thereon is conveyed to the fixing mechanism. The fixing mechanism in this embodiment includes a first fixing device 150 and a second fixing device 160. The first fixing device 150 includes a fixing roller 151, a pressure belt 152, and a post-fixing sensor 153. The fixing roller 151 heats the sheet 110 in order to thermally pressure-fix the images onto the sheet 110. The pressure belt 152 is used to bring the sheet 110 to pressure contact with the fixing roller 151. The post-fixing sensor 153 detects that the fixing is finished. The fixing roller 151 is a hollow roller, and includes therein a heater. The fixing roller 151 is configured to rotate to convey the sheet 110. The post-fixing sensor 153 detects the sheet 110 subjected to image fixing.

The second fixing device 160 is arranged on the downstream with respect to the first fixing device 150 in the conveying direction of the sheet 110, and is used to add gloss to the image formed on the sheet 110 subjected to fixing processing by the first fixing device 150 or to ensure the fixing performance. The second fixing device 160 includes a fixing roller 161, a pressure roller 162, and a post-fixing sensor 163. The fixing roller 161 has a configuration similar to that of the fixing roller 151, and functions similarly to the fixing roller 151. The pressure roller 162 functions similarly to the pressure belt 152. The post-fixing sensor 163 functions similarly to the post-fixing sensor 153. The second fixing device 160 performs fixing processing to the sheet 110 similarly to the first fixing device 150.

The second fixing device 160 may not be used depending on the type of the sheet 110 and the content of the image formation processing. A conveyance path 130 is provided in order to convey the sheet 110 subjected to fixing processing by the first fixing device 150 without causing the sheet 110 to pass through the second fixing device 160. Accordingly, a flapper 131 is provided on the downstream of the first fixing device 150 in the conveying direction of the sheet 110. The flapper 131 is used to guide the sheet 110 to any one of the second fixing device 160 and the conveyance path 130.

The sheet 110 that has passed through any one of the second fixing device 160 and the conveyance path 130 is discharged as it is in some cases, and is conveyed to a conveyance path 135 in other cases. Accordingly, a flapper 132 is provided at a position after a junction between a conveyance path following the second fixing device 160 and the conveyance path 130. The flapper 132 is used to guide the sheet 110 to any one of the conveyance path 135 and a discharge path of the sheet 110. The sheet 110 guided to the discharge path is discharged to the outside of the casing 101 with its surface having the image formed thereon facing upward. A downstream-side sensor 144 is arranged on the discharge path. The downstream-side sensor 144 detects the sheet 110 conveyed through the discharge path.

The conveyance path 135 is a path for conveying the sheet 110 to a reverse path 136 to be used for reversing the front and back surfaces of the sheet 110. A reverse sensor 137 which detects the sheet 110 is provided in the reverse path 136. When the reverse sensor 137 detects the trailing edge of the sheet 110, the conveying direction of the sheet 110 is reversed in the reverse path 136. The sheet 110 whose conveying direction is reversed is conveyed to any one of the conveyance path 135 and a reverse path 138. Accordingly, a flapper 133 is provided at a branch of the conveyance path 135 and the reverse path 138. When being conveyed to the conveyance path 135, the sheet 110 is guided by the flapper 133 to the conveyance path 135, and is discharged to the outside of the casing 101 with its front and back surfaces being reversed (surface having the image formed thereon facing downward). When the sheet 110 is conveyed to the conveyance path 135, the conveyance of the sheet 110 is controlled so that the conveying speed of the sheet 110 becomes a target conveying speed regardless of the paper type of the sheet 110. When being conveyed to the reverse path 138, the sheet 110 is guided by the flapper 133 to the reverse path 138. The sheet 110 guided to the reverse path 138 is conveyed to the transfer rollers 114 again with its front and back surfaces being reversed. In this manner, image formation is performed on the back surface of the sheet 110.

In the conveyance path 135, conveyance rollers 141 and 142 for conveying the sheet 110 are provided. The conveyance rollers 141 and 142 are each rotatable in both directions. Between the conveyance rollers 141 and the conveyance rollers 142, a color measurement sensor 200 and an upstream-side sensor 143 are provided. The color measurement sensor 200 is a colorimeter for reading a test chart for adjusting the image forming condition, which has been formed on the sheet 110. Results obtained by reading the test chart by the color measurement sensor 200 are used for image density adjustment of an image to be printed, tone correction, color mixture adjustment, or adjustment of the image forming condition such as an image geometrical characteristic. The upstream-side sensor 143 detects the sheet 110 conveyed through the conveyance path 135. When the color measurement sensor 200 reads the test chart, the sheet 110 having the test chart printed thereon passes through a reading position of the color measurement sensor 200 after passing through a detecting position of the upstream-side sensor 143, and then passes through a detecting position of the downstream-side sensor 144 via a conveyance path 139. The conveyance path 139 is a bent path, and is provided in the vicinity of the color measurement sensor 200. As described above, the conveying speed of the sheet 110 conveyed through the conveyance path 135 is controlled to become the target conveying speed regardless of the paper type of the sheet 110. When the conveying speed at the time of reading the test chart varies depending on the paper type of the sheet 110, it is required to change the layout of the test chart for each paper type of the sheet 110, or to determine the sampling timing for each paper type of the sheet 110. By controlling the conveying speed at the time of reading the test chart to the target conveying speed regardless of the paper type, it is not required to prepare image data for the test chart for each paper type, and limitation of the memory capacity due to the image data for the test chart can be suppressed. Further, by controlling the conveying speed at the time of reading the test chart to the target conveying speed regardless of the paper type, it is not required to perform different sampling control corresponding to the conveying speed of each paper type, and limitation of the memory capacity due to a complicated program can be suppressed.

<Color Measurement Sensor>

Figure 2:
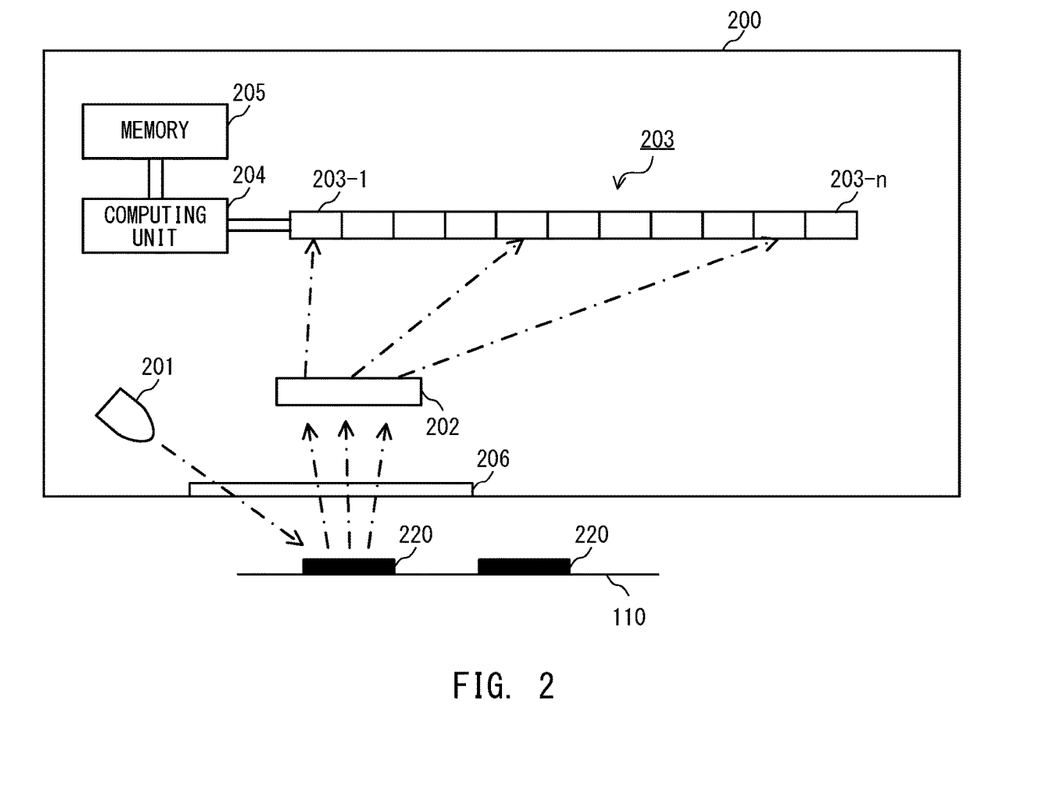
FIG. 2 is an explanatory configuration view of a color measurement sensor (reading unit).

FIG. 2 is an explanatory configuration view of the color measurement sensor 200. The color measurement sensor 200 measures reflected light from a test chart 220 formed on the sheet 110. The color measurement sensor 200 includes a white light emitting diode (LED) 201, a diffraction grating 202, a line sensor 203, a computing unit 204, a memory 205, and a lens 206. The white LED 201 is a light emitting portion, and radiates light to the sheet 110 conveyed through the conveyance path 135. The diffraction grating 202 spectrally disperses the light reflected by the test chart 220 by wavelength. The lens 206 condenses the light radiated from the white LED 201 to the test chart 220, and also condenses the light reflected by the test chart 220 to the diffraction grating 202.

The line sensor 203 is a light receiving portion including light receiving elements 203-1 to 203-$n$ corresponding to "n" pixels. Each of the light receiving elements 203-1 to 203-$n$ of the line sensor 203 receives the reflected light spectrally dispersed by wavelength by the diffraction grating 202. Each of the light receiving elements 203-1 to 203-$n$ outputs, as a detection result, a voltage (electrical signal) having a correlation with, for example, an intensity of the received reflected light. The correspondence between each of the light receiving elements 203-1 to 203-$n$ and the wavelength of the received reflected light is determined in advance. Accordingly, the light intensity value of each of the light receiving elements 203-1 to 203-$n$ corresponds to a reflected-light intensity (spectral data) of each wavelength.

The computing unit 204 converts the voltage value output from each of the light receiving elements 203-1 to 203-$n$ into a digital signal (light intensity value). The computing unit 204 further includes a spectral computing unit for computing a spectral reflectance from the spectral data obtained through conversion into the digital signal. The spectral data obtained through conversion into the digital signal by the computing unit 204 or the spectral reflectance computed by the spectral computing unit is output to a printer controller 103 (FIG. 3) to be described later. The memory 205 stores various types of data to be used for the operation of the line sensor 203.

<Controller>

Figure 3:
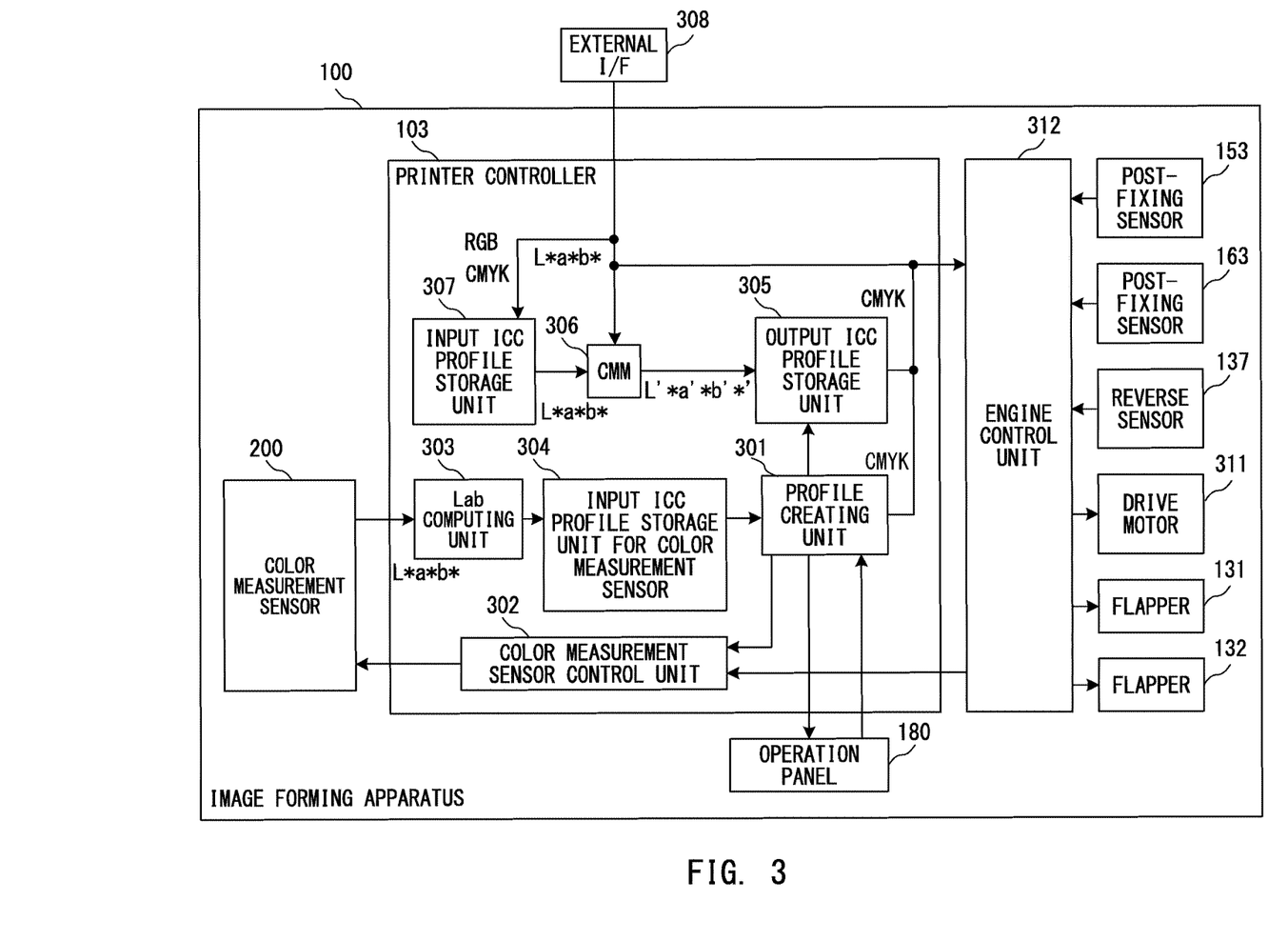
FIG. 3 is an explanatory diagram of a controller.

FIG. 3 is an explanatory diagram of a controller which controls the operation of the image forming apparatus 100 configured as described above. The image forming apparatus 100 includes, as the controller, a printer controller 103 and an engine control unit 312. The printer controller 103 controls the operation of the entire image forming apparatus 100. The engine control unit 312 controls the operation of the engine unit for use in image formation as described above. The printer controller 103 and the engine control unit 312 may be implemented by different processors, or may be implemented by one processor.

The engine control unit 312 is connected to the post-fixing sensors 153 and 163, the reverse sensor 137, a drive motor 311, and the flappers 131 and 132. The drive motor 311 drives the rollers for conveying the sheet 110. The engine control unit 312 controls the drive motor 311 and the flappers 131 and 132 based on the detection results obtained by the respective sensors, to thereby cause the engine unit to convey the sheet 110. Further, although not shown, the engine control unit 312 controls the operations of the image forming mechanism, the transfer mechanism, the feeding mechanism, and the fixing mechanism to perform image formation onto the sheet 110. The operation of the engine control unit 312 is controlled by the printer controller 103.

The printer controller 103 is connected to the operation panel 180, an external I/F 308, and the color measurement sensor 200. The external I/F 308 is a communication interface for performing communication to/from an external apparatus via a predetermined network. The printer controller 103 can receive a job or the like from the external apparatus via the external I/F 308. Details of the operation of the printer controller 103 are described later.

<Basic Adjustment Processing>

The image forming apparatus 100 according to this embodiment forms, onto the sheet 110, the test chart 220 (see FIG. 2) including a combination of a plurality of test images in order to maintain the image quality. The image forming apparatus 100 conveys the sheet 110 having the test chart 220 formed thereon from the conveyance rollers 141 of the conveyance path 135 in the direction of the conveyance rollers 142. The color measurement sensor 200 provided in the conveyance path 135 reads the test chart 220 formed on the sheet 110. The image forming apparatus 100 performs feedback control based on the detection result (reading result) obtained by the color measurement sensor 200, to thereby maintain the image quality, for example, color reproducibility.

The image forming apparatus 100 according to this embodiment creates a profile, and performs image formation through use of the created profile. As a profile for achieving excellent color reproducibility, in this embodiment, an ICC profile is used. As the profile, for example, a color rendering dictionary (CRD), a color separation table, CMYK simulation in ColorWise can also be used.

The image forming apparatus 100 creates an ICC profile as a color conversion profile based on the spectral reflectance of the test chart 220 output from the color measurement sensor 200. A color management module (CMM) 306 of the printer controller 103 to be described later performs color conversion processing through use of the created ICC profile so that the color of the image to be formed based on the image data becomes a target color.

A calculation expression for L*, a*, and b* is described. The color measurement sensor 200 spectrally disperses light radiated from the white LED 201 and reflected by a measurement target by the diffraction grating 202, and detects the dispersed light by the light receiving elements 203-1 to 203-$n$ arranged in respective wavelength regions of from 380 nm to 720 nm. In this embodiment, in order to improve the detection computation accuracy, the spectral reflectance is converted into coordinate information (L*, a*, b*) in a CIE L*a*b* color space through use of color matching functions as defined by the CIE. The ICC profile being the color conversion profile is created based on a relationship between the data of L*, a*, and b* and a signal value (image data) of the test chart 220.

<L*a*b* Computation>

The following refers to a method of calculating the coordinate information (L*, a*, b*) in the CIE L*a*b* color space from the spectral reflectance (defined in ISO 13655).

a. The spectral reflectance R($\lambda$) of the sample is obtained (from 380 nm to 780 nm).

b. Color matching functions x($\lambda$), y($\lambda$), and z($\lambda$) and a standard light spectral distribution SD50($\lambda$) are prepared.

The color matching functions are defined by JIS Z8701. SD50($\lambda$) is defined by JIS Z8720, and is also called an auxiliary standard illuminant D50.

c. $R(\lambda) \times SD50\lambda) \times x(\lambda)$, $R(\lambda) \times SD50(\lambda) \times y(\lambda)$, $R(\lambda) \times SD50(\lambda) \times z(\lambda)$ d. Integration of each wavelength is performed.

$$\Sigma\{R(\lambda) \times SD50(\lambda) \times x(\lambda)\}$$

$$\Sigma\{R(\lambda) \times SD50(\lambda) \times y(\lambda)\}$$

$$\Sigma\{R(\lambda) \times SD50(\lambda) \times z(\lambda)\}$$

e. The product of the color matching function $y(\lambda)$ and the standard light spectral distribution SD50($\lambda$) is integrated with respect to each wavelength.

$$\{SD50(\lambda) \times y(\lambda)\}$$

f X, Y, and Z are calculated.

$$X=100 \times \Sigma\{SD50(\lambda) \times y(\lambda)\}/\Sigma\{R(\lambda) \times SD50(\lambda) \times x(\lambda)\}$$

$$Y=100 \times \Sigma\{SD50(\lambda) \times y(\lambda)\}/\Sigma\{R(\lambda) \times SD50(\lambda) \times y(\lambda)\}$$

$$Z=100 \times \Sigma\{SD50(\lambda) \times y(\lambda)\}/\Sigma\{R(\lambda) \times SD50(\lambda) \times z(\lambda)\}$$

g. L*, a*, and b* are calculated.

$$L^* = 116 \times (Y/Yn)^{(1/3)} - 16$$

$$a^* = 500\{(X/Xn)^{(1/3)} - (Y/Yn)^{(1/3)}\}$$

$$b^* = 200\{(Y/Yn)^{(1/3)} - (Z/Zn)^{(1/3)}\}$$

provided that Y/Yn>0.008856

When Y/Yn>0.008856 is satisfied, Xn, Yn, and Zn are tristimulus values of standard light.

$$(X/Xn)^{(1/3)} = 7.78(X/Xn)^{(1/3)} + 16/116$$

$$(Y/Yn)^{(1/3)} = 7.78(Y/Yn)^{(1/3)} + 16/116$$

$$(Z/Zn)^{(1/3)} = 7.78(Z/Zn)^{(1/3)} + 16/116$$

<Profile Creation>

When a component is replaced by a customer engineer, before a job for which color matching accuracy is required is output, or when a user desires to know the hue of a final output product at a design planning stage or the like, the user operates the operation panel 180 to give an instruction to perform profile creation processing. The printer controller 103 creates a profile in accordance with the instruction from the operation panel 180. As illustrated in FIG. 3, the printer controller 103 includes a profile creating unit 301, a color measurement sensor control unit 302, a Lab computing unit 303, and an input ICC profile storage unit 304 for the color measurement sensor. Further, the printer controller 103 includes an output ICC profile storage unit 305, the CMM 306, and an input ICC profile storage unit 307.

A profile creation instruction is input from the operation panel 180 to the profile creating unit 301. The profile creating unit 301 transmits, in accordance with the instruction, a signal to the engine control unit 312 so as to form CMYK (cyan, magenta, yellow, and black) color signals of an ISO 12642 test form (test chart) without using a profile. At the same time, the printer controller 103 transmits a color measurement instruction to the color measurement sensor 200 by the color measurement sensor control unit 302. The engine control unit 312 controls the operation of the engine unit to print the ISO 12642 test form (test chart) onto the sheet 110. With respect to the sheet 110 having the test form (test chart) printed thereon, the test images included in the test chart are measured by the color measurement sensor 200. The spectral reflectance of the measured test images is input to the printer controller 103. The spectral reflectance is converted into L*, a*, b* data by the Lab computing unit 303. The L*, a*, b* data is input to the profile creating unit 301 via the input ICC profile storage unit 304 for the color measurement sensor. The spectral reflectance may be converted into coordinate information (X, Y, Z) in a CIE 1931 XYZ colorimetric system, which is an apparatus-independent color space and is different from the CIE L*a*b* color space.

The profile creating unit 301 creates an output ICC profile based on the relationship between the CMYK color signals of the test form and the input L*, a*, b* data. The profile creating unit 301 exchanges the output ICC profile already stored in the output ICC profile storage unit 305 for the created output ICC profile.

The ISO 12642 test form (test chart) includes test images of CMYK color signals covering a color reproducible range that can be output by general copying machines. The profile creating unit 301 creates a color conversion table based on the relationship between each color signal value and the measured L*, a*, b* data. That is, a conversion table (A2Bx tag) from CMYK to L*, a*, b* data is created. The profile creating unit 301 generates, based on this conversion table, a conversion table for converting L*', a*', b*' data into data of CMYK. Color mixture adjustment is processing of generating, by the profile creating unit 301, a conversion table for inversely converting the L*', a*', b*' data into the data of CMYK based on the measurement results of the test chart. The L*', a*', b*' is generated from the L*, a*, b* data in the CMM 306.

Figure 4:
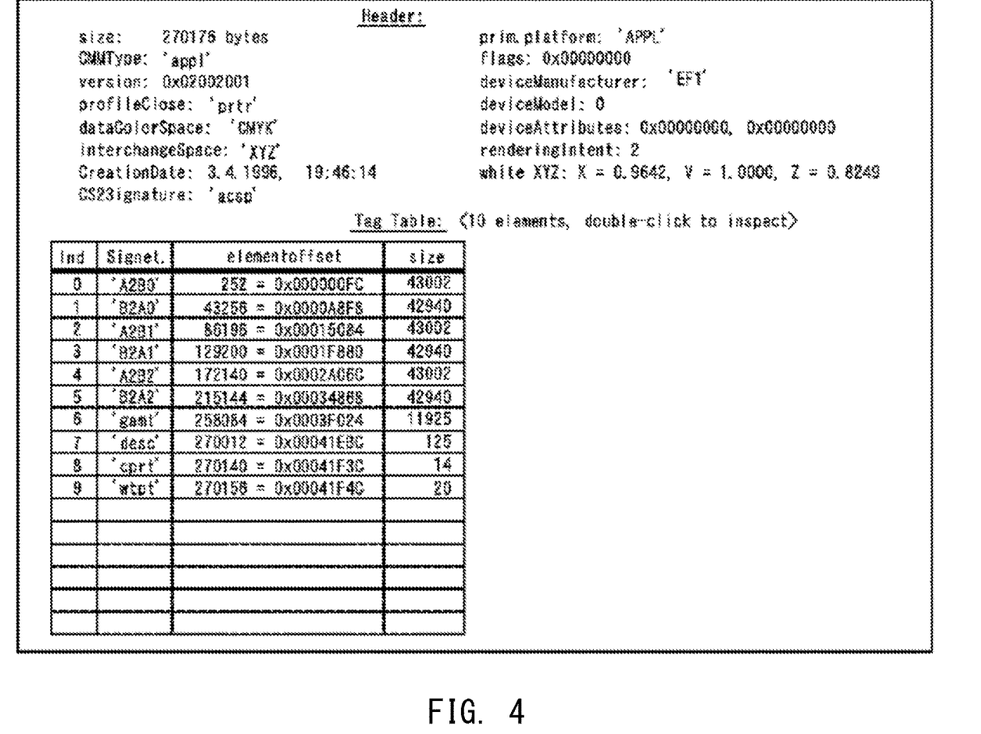
FIG. 4 is an explanatory view of an ICC profile.

FIG. 4 is an explanatory view of the ICC profile. The ICC profile includes a header, tags, and data. In addition to the color conversion table, for example, the tags describe even a tag (gamt) representing whether a given color expressed by a white point (Wtpt) or a Lab value defined in the profile falls inside or outside the reproducible range of the hard copy.

The printer controller 103 may receive the profile creation instruction from the external apparatus via the external I/F 308. In this case, the printer controller 103 obtains an output ICC profile created by the external apparatus, and performs image processing (color conversion) by an application corresponding to the ICC profile.

<Color Conversion Processing>

In color conversion in general color image formation, image data input from the external I/F 308, assuming to be RGB signal values or standard printing CMYK signal values of Japan Color or the like, is stored in the input ICC profile storage unit 307 for external input. In this case, the external I/F 308 is connected to a scanner or the like as the external apparatus. The image data stored in the input ICC profile storage unit 307 is subjected to conversion of from RGB to L*a*b* or from CMYK to L*a*b*. The input ICC profile storage unit 307 includes a one-dimensional LUT for controlling a gamma characteristic of the image data, a multi-dimensional color LUT which is called direct mapping, and a one-dimensional LUT (referred to as "tone correction table") for controlling the gamma of generated conversion data. The image data stored in the input ICC profile storage unit 307 is converted from the device-dependent color space into device-independent L*, a*, b* data based on those tables.

Figure 5:
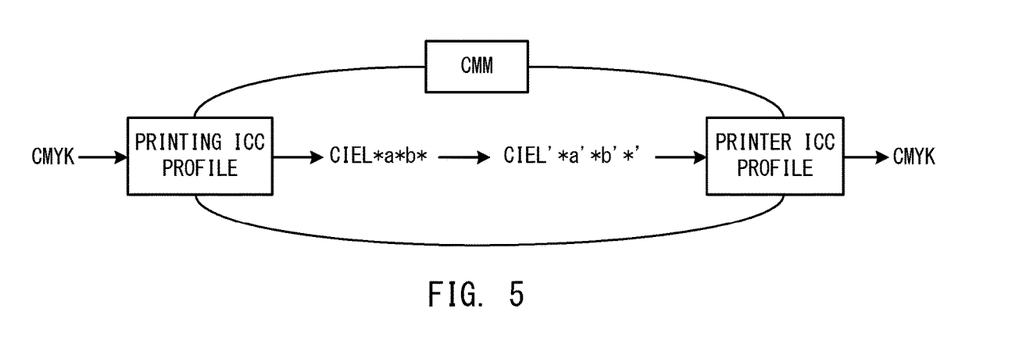
FIG. 5 is an explanatory diagram of color management.

The image data converted into the L*, a*, b* data is input to the CMM 306. FIG. 5 is an explanatory diagram of color management performed by the CMM 306. The CMM 306 performs GAMUT conversion of mapping a mismatch between a reading color space of the scanner or the like serving as the external apparatus and an output color reproducible range of the image forming apparatus 100 serving as an output apparatus. Further, the CMM 306 performs color conversion of adjusting a mismatch (also called a color temperature setting mismatch) between a light source type in input and a light source type in observing an output product. The CMM 306 further performs black letter determination or the like. In this manner, the L*, a*, b* data is converted into L*', a*', b*' data to be stored in the output ICC profile storage unit 305. As described above, the created profile is stored in the output ICC profile storage unit 305. Color conversion is performed based on the newly created ICC profile to convert the data into CMYK signals dependent on the output apparatus. The CMYK signals are thus output.

The input ICC profile storage unit 307 and the output ICC profile storage unit 305 have been separately described. As illustrated in FIG. 5, the CMM 306 is a module for controlling color management, and performs color conversion through use of the input profile and the output profile.

<Adjustment of Conveying Speed 1>

Figure 6:
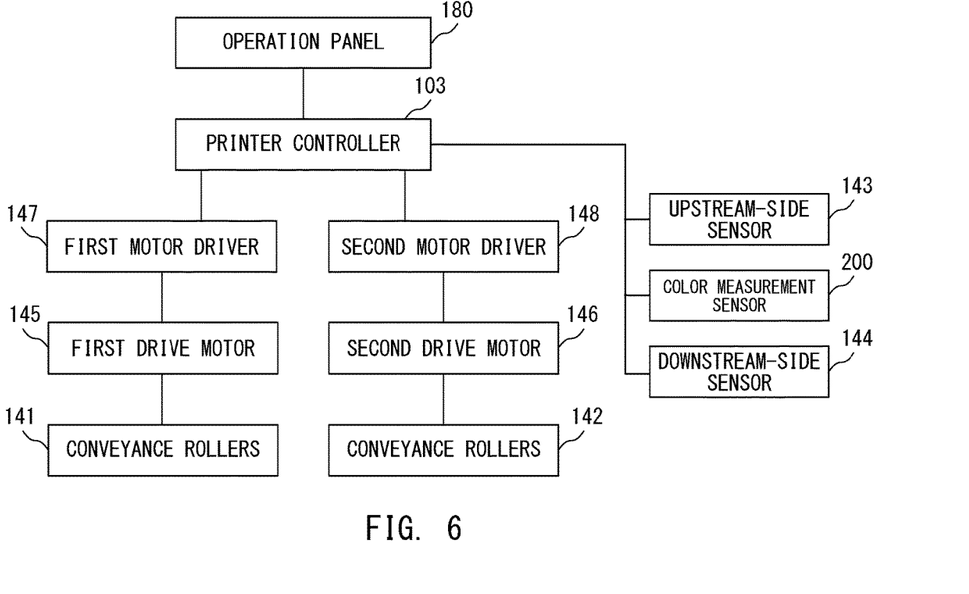
FIG. 6 is a diagram of a control configuration in the vicinity of the color measurement sensor (reading unit).

FIG. 6 is a diagram of a control configuration in the vicinity of the color measurement sensor 200, which is a control target in this embodiment. As described above, the operation of the color measurement sensor 200 is controlled by the printer controller 103 (color measurement sensor control unit 302). Detection results obtained by the upstream-side sensor 143 and the downstream-side sensor 144 are transmitted to the printer controller 103. The printer controller 103 controls the operations of the two types of conveyance rollers 141 and 142 adjacent to the color measurement sensor 200. Accordingly, the printer controller 103 is connected to a first motor driver 147 and a second motor driver 148. The first motor driver 147 controls drive of a first drive motor 145 serving as a drive source of the conveyance rollers 141. The second motor driver 148 controls drive of the second drive motor 146 serving as a drive source of the conveyance rollers 142.

The printer controller 103 sets, in response to selection of the type of the sheet to be subjected to color measurement, which is performed on the operation panel 180 by the user, the type of the sheet on which the test chart is to be formed in the color measurement mode. When the printer controller 103 is set to the color measurement mode, the engine control unit 312 controls each unit of the image forming apparatus 100 so that the test chart is printed onto the sheet 110 of the set type, and conveys the sheet 110 to the reading position of the color measurement sensor 200.

The test chart can include several thousands of test images at the maximum. For example, as the test chart, ten test images in each color are printed on the first sheet for checking the maximum density, one-hundred test images in each color are printed on the second sheet for checking the tone, and about two-hundred test images are printed on the third sheet and the subsequent sheets for checking the color tone. Finer adjustment is allowed as the number of test images required for color tone checking is larger, and a color difference ΔE can be reduced. However, as the number of test images is increased, the number of sheets used for color measurement (waste paper) is increased. In order to check the color tone with a small number of sheets and a minimum number of waste paper, it is required to print about two-hundred test images onto at least one sheet 110. As a result, an area of the test image to be read at the time of color measurement is roughly about, in a case of the smallest area, (30 mm in width)×(15 mm in length) when, for example, about two-hundred test images are printed onto an A3-size (420 mm×297 mm) sheet 110.

In a spectral colorimeter as the color measurement sensor 200, a spot diameter for receiving the reflected light is about 2 mm. The color measurement sensor 200 in this embodiment performs sampling about twenty times with respect to one test image, and averages the values of the reading results as a color measurement result. A sampling cycle is about 1 millisecond. The conveying speed of the sheet 110 at the time of color measurement is close to an image forming speed so that usage in a larger number of apparatus models is allowed. In this embodiment, description is given of a case in which the color measurement is performed while the sheet 110 is conveyed at the target conveying speed of 400 mm/s.

In order to accurately read the test image having a length in the conveying direction of about 15 mm, when the conveying speed is 400 mm/s, considering the outer diameter tolerance of ±0.5% of the conveyance rollers 141 and 142, the early side has an allowable range of +0.5%. The delay side has an allowable range of from −1.0% to +0.5% considering the outer diameter tolerance of ±0.5% of the conveyance rollers 141 and 142 and the outer diameter friction of ±0.5% due to the endurance of the conveyance rollers 141 and 142. That is, it is required to cause the conveying speed of the sheet 110 to fall within a range of from "speed slower by 1.0% than the target conveying speed" to "speed faster by 0.5% than the target conveying speed."

Figure 7:
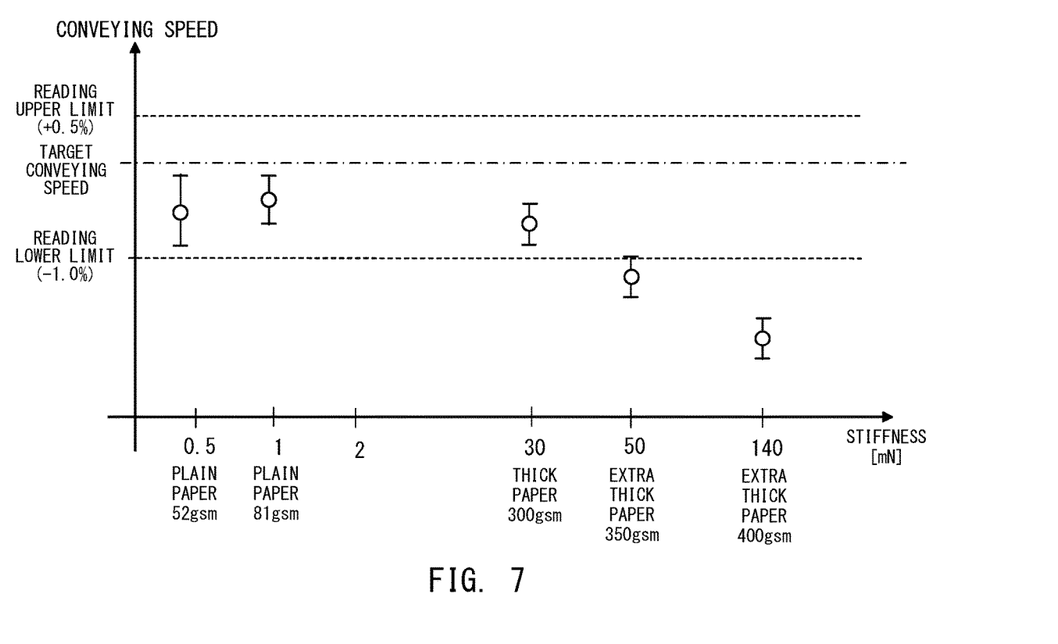
FIG. 7 is an explanatory graph of a conveying speed of each type of sheet.

FIG. 7 is an explanatory graph of the conveying speed of each type of sheet. This conveying speed is a speed at the time when the sheet 110 passes through the reading position of the color measurement sensor 200. The conveying speed is calculated by dividing the length of the sheet 110 in the conveying direction by a time period required for the sheet 110 to pass through the reading position of the color measurement sensor 200. The time period required for the sheet to pass through the reading position of the color measurement sensor 200 is, for example, a time period T in which a laser displacement meter (not shown) mounted on the color measurement sensor 200 detects the sheet (for example, a time period from when a detection result changes from OFF to ON to when the detection result changes from ON to OFF). FIG. 7 shows an average value (circle mark of FIG. 7) of the conveying speeds of the sheet calculated as described above and variations thereof. The conveying speed includes measurement results in both states of when a coefficient of friction μ of the surface of each of the conveyance rollers 141 and 142 is reduced by causing paper dust to adhere thereto and when the coefficient of friction μ is in an initial state.

Regarding the conveying speed of a sheet (plain paper or thick paper) having a basis weight of 300 gsm or less, a difference between the target conveying speed and the actual conveying speed at the time of color measurement falls within an allowable range (within a range of from a reading upper limit and a reading lower limit). Regarding the conveying speed of a sheet (extra thick paper) having a basis weight larger than 300 gsm, the difference between the target conveying speed and the actual conveying speed at the time of color measurement is outside of the allowable range. The conveying speed is uniformly slower by about 0.2% to 0.3% than the target conveying speed.

The stiffness of the plain paper or the thick paper is, for example, about 30 mN. Meanwhile, the stiffness of the extra thick paper having the basis weight exceeding 300 gsm is greatly larger than 30 mN. Accordingly, a conveyance resistance at the time when the sheet 110 is conveyed through the bent path is increased, and the conveying speed of the sheet 110 becomes slower than the lower limit of the allowable range.

As described above, the conveying speed of the sheet 110 is abruptly reduced when the basis weight exceeds 300 gsm. The reason therefor is because, when the sheet 110 having a high stiffness (being hard) passes through the bent conveyance path 139, the sheet 110 strongly receives a reaction force from the conveyance path 139 so that the conveyance resistance is increased, and the conveyance rollers 141 and 142 convey the sheet 110 while slipping at a small degree. The ratio of the slipping is dependent not on the presence or absence of the paper dust but on the stiffness of the sheet 110. It is well known that the stiffness of the sheet 110 has a correlation with the basis weight. In view of the above, in the image forming apparatus 100, the adjustment is performed so that, as the stiffness of the sheet 110 is increased, a conveying-speed set value is increased so that the conveying speed becomes faster.

In order to allow the color measurement sensor 200 to be mounted on a plurality of apparatus models, the conveying speed of the sheet 110 is fixed to a conveying speed of a product adopting the slowest image forming speed. When there is a delay in the passage time of the sheet 110 at the reading position of the color measurement sensor 200, the color measurement sensor 200 reads a position on the sheet 110 different from an original position to be read. This situation causes reading failure. When the reading failure occurs, the image forming condition cannot be appropriately adjusted. The deviation of the conveying speed is increased as the sheet 110 comes closer to the trailing edge thereof in the conveying direction.

Figure 8:
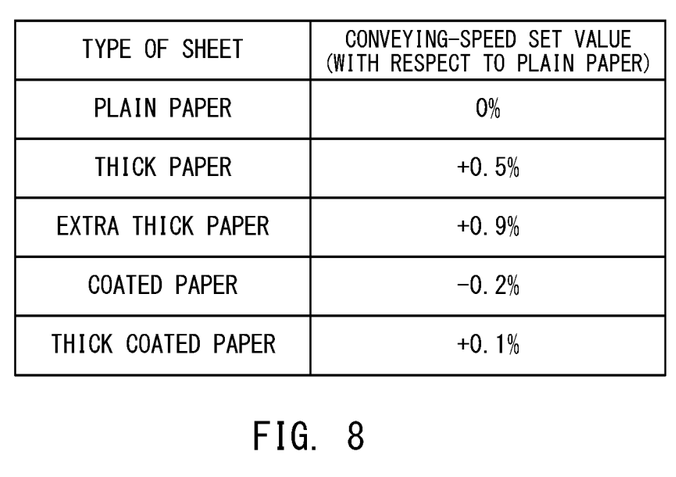
FIG. 8 is an explanatory table of an adjustment value of each type of sheet.

In this embodiment, the rotation speeds of the conveyance rollers 141 and 142 are adjusted so that the conveying speed of the sheet 110 passing through the reading position of the color measurement sensor 200 falls within the allowable range of the target conveying speed. FIG. 8 is an explanatory table of an adjustment value of the conveying speed (conveying-speed set value) of each type of sheet. The conveying-speed set value of each type of sheet is set so that the conveying speed at the time of color measurement falls within the allowable range. The conveying-speed table of FIG. 8 is stored in, for example, a memory (not shown) provided in the printer controller 103.

Information on the type of the sheet 110 set through manual input by the user (information related to the basis weight of the sheet 110) is input from the printer controller 103 to the engine control unit 315. When the sheet 110 is plain paper (for example, the basis weight is from 64 gsm to 120 gsm), the engine control unit 315 sets the conveying-speed set value to 0%. Then, the engine control unit 315 controls the rotational drive of each of the first drive motor 145 and the second drive motor 146 so that the rotation speed of each of the first drive motor 145 and the second drive motor 146 at the time of reading the chart becomes a standard rotation speed. In this manner, the conveying speed of the sheet 110 conveyed by the conveyance rollers 141 and 142 becomes the target conveying speed.

When the sheet is thick paper (for example, the basis weight is from 120 gsm to 300 gsm), the engine control unit 315 sets the conveying-speed set value to +0.5%. According to the experiment results of FIG. 7, the average of the actual conveying speeds of the thick paper is slightly slower than the average of the actual conveying speeds of the plain paper. Accordingly, the image forming apparatus 100 sets the rotation speed for the thick paper so as to be faster than the rotation speed for the plain paper within a range in which the actual conveying speed is controlled within the allowable range of the target conveying speed. The engine control unit 315 controls the rotational drive of each of the first drive motor 145 and the second drive motor 146 so that the rotation speed of each of the first drive motor 145 and the second drive motor 146 at the time of reading the chart becomes a first rotation speed that is faster than the standard rotation speed. When the type of the sheet is thick paper, in accordance with the conveying-speed set value, the first drive motor 145 and the second drive motor 146 are rotated at a speed faster by 0.5% than that in the case of the plain paper. In this manner, the conveying speed of the sheet 110 conveyed by the conveyance rollers 141 and 142 becomes the target conveying speed.

When the sheet is extra thick paper (for example, the basis weight is from 300 gsm to 450 gsm), the engine control unit 315 sets the conveying-speed set value to +0.9%. Further, the engine control unit 315 controls the rotational drive of each of the first drive motor 145 and the second drive motor 146 so that the rotation speed of each of the first drive motor 145 and the second drive motor 146 at the time of reading the chart becomes a second rotation speed that is faster than the first rotation speed. When the type of the sheet is extra thick paper, in accordance with the conveying-speed set value, the first drive motor 145 and the second drive motor 146 are rotated at a speed faster by 0.9% than that in the case of the plain paper. In this manner, the conveying speed of the sheet 110 conveyed by the conveyance rollers 141 and 142 becomes the target conveying speed.

When the sheet is coated paper (for example, the basis weight is from 85 gsm to 220 gsm), the engine control unit 315 sets the conveying-speed set value to −0.2%. The reason therefor is because the inventors have performed an experiment of measuring the conveying speeds of the plain paper and the coated paper which have the same basis weight and have partially entered the bent path. In this experiment, the inventors have found that the conveying speed of the coated paper became faster than the conveying speed of the plain paper. The engine control unit 315 controls the rotational drive of each of the first drive motor 145 and the second drive motor 146 so that the rotation speed of each of the first drive motor 145 and the second drive motor 146 at the time of reading the chart becomes a third rotation speed that is slower than the standard rotation speed. When the type of the sheet is coated paper, in accordance with the conveying-speed set value, the first drive motor 145 and the second drive motor 146 are rotated at a speed slower by 0.2% as compared to that in the case of the plain paper. When the sheet is thick coated paper (for example, the basis weight is from 220 gsm to 350 gsm), the conveying-speed set value is +0.1%. In accordance with the conveying-speed set value, the first drive motor 145 and the second drive motor 146 are rotated at a speed faster by 0.1% as compared to that in the case of the plain paper.

As described above, the image forming apparatus 100 controls the rotation speed of each of the first drive motor 145 and the second drive motor 146 in accordance with the type of the sheet so as to perform speed adjustment so that the conveying speed of the sheet falls within the allowable range of the target conveying speed. Accordingly, even when inline color measurement is performed through use of the color measurement sensor 200, the conveying speed of the sheet passing through the reading position of the color measurement sensor 200 falls within the allowable range. In this manner, the test chart formed on the sheet passing through the bent path can be highly accurately measured regardless of the paper type.

The conveying speed changes depending on the type of the sheet even at the same rotation speed of the conveyance rollers 141 and 142 due to the pressure, the hardness, the resistance value, and the like of the conveyance rollers 141 and 142. Accordingly, the conveying-speed set value is experimentally derived. When the conveying speed can vary in accordance with the type of the sheet, the number of types of sheets that can adapt to the inline color measurement is increased. As a result, the number of types of sheets that can be subjected to color measurement through use of the test image having the same length is increased, and hence the adaptability of the color measurement sensor 200 to the sheet is improved.

<Adjustment of Conveying Speed 2>

When the image forming apparatus 100 is used for a long period, the outer diameter of each of the conveyance rollers 141 and 142 is decreased. The reason therefor is because the rubber of the surface of each of the conveyance rollers 141 and 142 is worn away due to the passage of the sheet 110. As a result, even at the same rotation speed of the drive motor, the conveying speed of the sheet 110 after endurance becomes slower.

In the color measurement mode, there is a possibility that the adjustments of the image forming conditions of different types (for example, image density adjustment, tone correction, and color mixture adjustment) are successively executed. In this case, at least three or more sheets are passed. The number of test images to be printed onto one sheet in the color mixture adjustment is larger than the number of test images to be printed onto one sheet in the image density adjustment or the tone correction. Accordingly, the size of the test image to be used in the color mixture adjustment is smaller than the size of the test image to be used in the image density adjustment, and is also smaller than the size of the test image to be used in the tone correction. Thus, the adjustment having the highest possibility of causing reading failure in the inline color measurement is the color mixture adjustment of the thick paper at the time when the endurance progresses.

In view of the above, the conveying-speed table at the time of color measurement is changed in accordance with the detection timing of detecting the sheet 110 by each of the upstream-side sensor 143 arranged on the upstream side of the color measurement sensor 200 in the sheet conveying direction and the downstream-side sensor 144 arranged on the downstream side thereof. When the conveying-speed table is changed, the rotation speeds of the first drive motor 145 and the second drive motor 146 are adjusted.

Figure 9A:
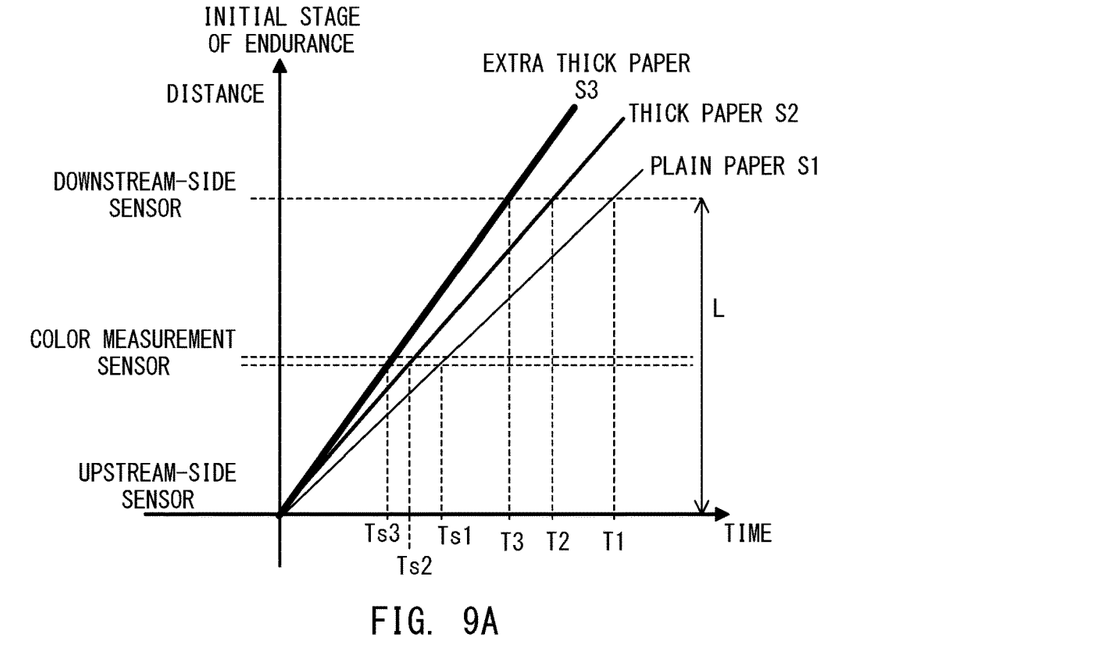
FIG. 9A and FIG. 9B are explanatory graphs of a timing of each type of sheet.
Figure 9B:
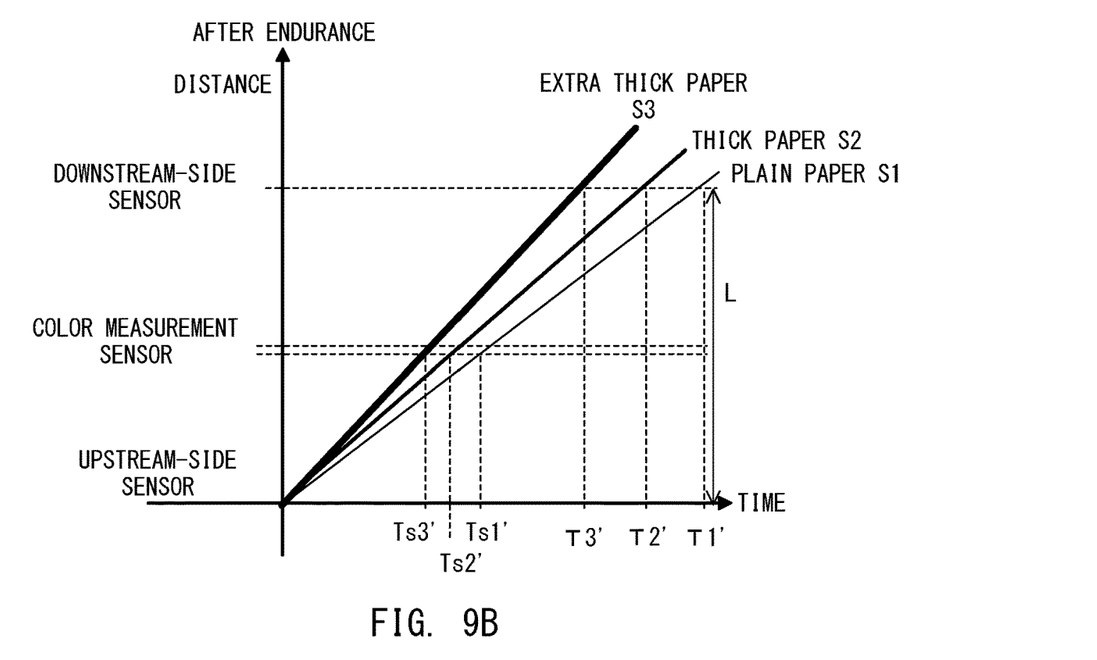

FIG. 9A and FIG. 9B are explanatory graphs of a timing of each type of sheet 110 passing through the reading position of the color measurement sensor 200 after the endurance of the image forming apparatus 100. FIG. 9A shows the timing before the endurance, and FIG. 9B shows the timing after the endurance. A distance from the upstream-side sensor 143 to the downstream-side sensor 144 is represented by L (mm). A target time of plain paper S1 until passage through the reading position of the color measurement sensor 200 from the detecting position of the upstream-side sensor 143 is represented by Ts1 (FIG. 9A). A target time of the plain paper S1 until passage through the detecting position of the downstream-side sensor 144 from the detecting position of the upstream-side sensor 143 is represented by T1.

A time of the first sheet of the plain paper S1 after the endurance until passage through the detecting position of the downstream-side sensor 144 from the detecting position of the upstream-side sensor 143 is represented by T1'. A difference $\Delta(=T1'-T1)$ between the time T1' and the target time T1 is reflected on the conveying-speed table at the time of color measurement of the second sheet of the plain paper. The conveying-speed set value of the conveying-speed table is corrected by $L/\Delta T$.

For example, in a case of a change $\Delta V$ (=L/T1'−L/T1) in apparent speed of the conveying speed at the time of L=200 mm, T1=2,000 milliseconds, and (T1' after endurance)=2,020 milliseconds, a target conveying speed V" of the plain paper at the time of color measurement of the second sheet and the subsequent sheets is expressed by the following expression.

$$V'' = V + \alpha V/100 = V(1 + \alpha/100)$$

Symbol "a" represents an amount (%) for correcting an amount of speed reduction due to the endurance, and is expressed by the following expression.

$$\alpha/100 =$$
$$\Delta V/V = (L/T1' - L/T1)/L/T1 = (T1' - T1)/T1 = (20)/2000 = 0.001$$
$$\alpha = 0.1\%$$

In this case, the conveying-speed set value of the plain paper of the conveying-speed table is adjusted by 0.1%. Through such adjustment, even when there is a slight delay in the conveying speed at the time when the color of the maximum-density test chart including large test images is measured, the delay of the conveying speed is reflected on the conveying-speed table by the time when the test charts of the second sheet and the subsequent sheets are read. Accordingly, small test images printed on the second sheet and the subsequent sheets are also accurately read.

Through correction of the conveying-speed set value in accordance with the endurance, even when the inline color measurement is performed through use of the color measurement sensor 200, the conveying speed of the sheet 110 passing through the reading position of the color measurement sensor 200 falls within the allowable range. In this manner, the influence caused by the endurance of the conveyance rollers for conveying the sheet 110 is suppressed, and the test chart (test image) printed on the sheet 110 is accurately read. When the conveying speed can vary in accordance with the type of the sheet 110 and the endurance of the conveyance rollers 141 and 142, the number of types of sheets adaptable to the inline color measurement is increased. As a result, the number of types of sheets that can be subjected to color measurement through use of the test image having the same length is increased, and hence the adaptability of the color measurement sensor 200 to the sheet is improved.

<Adjustment of Conveying Speed 3>

The wear amount of the outer diameter of each of the conveyance rollers 141 and 142 is predictable to some extent based on a sheet passage endurance experiment. A change amount of the wear amount of the outer diameter of each of the conveyance rollers 141 and 142 in accordance with the number of passed sheets matches a change amount of the conveying speed of the sheet 110 conveyed by the conveyance rollers 141 and 142. Accordingly, a drive frequency of the first drive motor 145 or the second drive motor 146 for driving the conveyance rollers 141 or the conveyance rollers 142 adjacent to the color measurement sensor 200 is changed in accordance with the number of passed sheets.

Figure 10A:
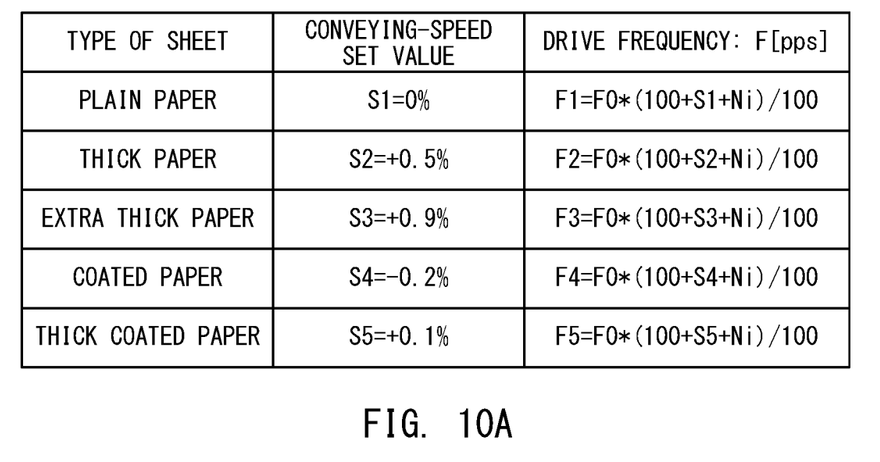
FIG. 10A and FIG. 10B show examples of a conveying-speed table.
Figure 10B:
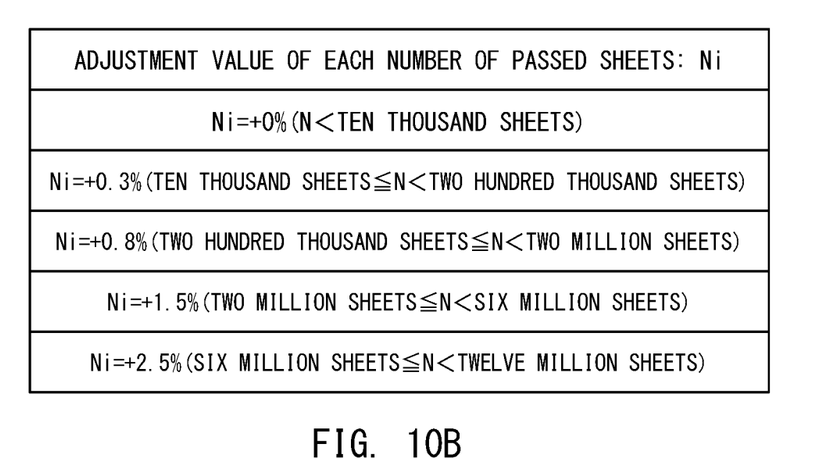

FIG. 10A and FIG. 10B show examples of the conveying-speed table in this case. FIG. 10A is a table for showing a relationship between the conveying-speed set value and the drive frequency of each type of sheet. FIG. 10B is a table for showing a relationship of an adjustment value of each number of passed sheets. The printer controller 103 counts the number of passed sheets of each of the conveyance rollers 141 and the conveyance rollers 142.

For example, the thick paper having the basis weight of 300 gsm has the conveying-speed set value of S2=+0.5%. When the number of passed sheets is about 5,000, an adjustment value Ni is 0% (see FIG. 10B). A drive frequency F2 of the drive motor at the time of color measurement is F2=F0 (100+0.5+0)/100=1.005. F0 represents an initial drive frequency of the drive motor. In this case, the first drive motor 145 or the second drive motor 146 is driven to rotate at a rotation speed that is 1.005 times as large as the initial number of revolutions of the motor.

Further, for example, the extra thick paper having the basis weight of 350 gsm has the conveying-speed set value of S3=+0.9%. When the number of passed sheets is about 5,000,000, an adjustment value Ni is +1.5%. A drive frequency F3 of the drive motor at the time of color measurement is F3=F0 (100+0.9+1.5)/100=1.024. In this case, the first drive motor 145 or the second drive motor 146 is driven to rotate at a rotation speed that is 1.024 times as large as the initial number of revolutions of the motor.

As described above, even when the endurance of the image forming apparatus 100 progresses, the drive frequency of the drive motor is adjusted so that the conveying speeds of the sheets 110 of various types can be adjusted so as to fall within the allowable range. In this manner, the influence caused by the endurance of the conveyance rollers 141 and 142 for conveying the sheet 110 is suppressed, and the test chart (test image) printed on the sheet 110 is accurately read. When the conveying speed can vary in accordance with the type of the sheet 110, the number of types of sheets adaptable to the inline color measurement is increased. As a result, the number of types of sheets that can be subjected to color measurement through use of the test image having the same length is increased, and hence the adaptability of the color measurement sensor 200 to the sheet is improved.

The conveyance rollers 141 and the conveyance rollers 142 are replaced due to occurrence of random failure or regular maintenance. When the conveyance rollers are replaced, the printer controller 103 resets the count value of the number of passed sheets. The image forming apparatus 100 counts the number of passed sheets of each of the conveyance rollers 141 and the conveyance rollers 142 separately from the durable number of sheets of the main body.

As described above, when the conveying speed of the sheet 110 can be adjusted, the color measurement sensor 200 can accurately read the test chart even in the vicinity of the bent conveyance path 139. In this manner, the test chart can be read from a large number of types of sheets 110, and the image forming condition can be corrected for each type of sheet 110. Further, the color measurement sensor 200 can be arranged in the vicinity of the bent conveyance path 139, and hence the main body of the image forming apparatus 100 can be downsized. Even when the bent conveyance path 139 is located on the upstream side of the color measurement sensor 200 in the conveying direction of the sheet 110, the adjustment of the conveying speed of the sheet 110 as in this embodiment is effective for the reading of the image by the color measurement sensor 200. As described above, according to the present disclosure, the test chart formed on the sheet passing through the bent path can be highly accurately measured regardless of the paper type.

Description has been given above of, as the adjustment of the image forming condition performed by the image forming apparatus 100, the color mixture adjustment in which the conversion table is generated based on the measurement results of the test chart. However, the adjustment of the image forming condition is not limited to the color mixture adjustment. As the adjustment of the image forming condition, for example, there is image density adjustment of controlling the intensity (laser power) of laser light to be emitted from the light emitting portion 108 of the laser scanner 107 based on results obtained by reading a test chart for laser power adjustment by the color measurement sensor 200. Further, as the adjustment of the image forming condition, for example, there is tone correction of generating a one-dimensional LUT (also referred to as "tone correction table") based on results obtained by reading tone test images by the color measurement sensor 200. When the image density adjustment or the tone correction is executed, the density of the image to be formed by the image forming apparatus 100 is adjusted. Further, as the adjustment of the image forming condition, for example, there is geometrical characteristic correction of generating correction data for correcting the geometrical characteristic of the image to be formed on the sheet based on results obtained by reading a test chart for geometrical correction by a CIS (or a CCD sensor) in place of the color measurement sensor 200. The test chart for geometrical correction is a test chart obtained by forming marks at four corner portion regions of the sheet. The correction data is, for example, data to be used in the printer controller 103 to subject the image to be formed on the sheet to affine transformation. The image forming apparatus 100 forms an image based on the image data subjected to image processing based on the correction data so that a squareness of the image to be formed on the sheet, a position of the image with respect to the sheet, or the like is adjusted to a target value.

Description of the image forming apparatus 100 has been given above as a configuration in which the drive source of the conveyance rollers 141 and the drive source of the conveyance rollers 142 are different from each other. However, in the image forming apparatus 100, both of the conveyance rollers 141 and the conveyance rollers 142 may be driven to rotate by one motor (drive source). In this case, the number of motor drivers for controlling the drive of the common motor may be one. The wear amounts of the conveyance rollers 141 and 142 are substantially the same. Thus, even with this configuration, the rotation speed can be controlled to an appropriate speed in accordance with the paper type, and the chart formed on the sheet can be highly accurately measured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-094954, filed Jun. 7, 2021, which is hereby incorporated by reference herein in its entirety.

What is claimed is:
1. An image forming apparatus comprising:
  an image forming unit configured to form an image onto a sheet;
  a fixing unit configured to fix the image on the sheet;
  a conveyance roller configured to convey the sheet from the fixing unit through a conveyance path, the conveyance path including a curved path;

a sensor configured to read the image on the sheet conveyed through the conveyance path by the conveyance roller, the sensor being configured to read the image on the sheet when part of the sheet is conveyed through the curved path; and a controller configured to obtain information related to a type of the sheet, and to control, based on the information, a conveying speed of the sheet conveyed by the conveyance roller when the sensor reads the image.

2. The image forming apparatus according to claim 1, wherein the conveyance roller is provided upstream of the curved path in a conveying direction in which the sheet is conveyed by the conveyance roller.

3. The image forming apparatus according to claim 1, wherein the conveyance roller is provided upstream of a reading position at which the sensor reads the image in a conveying direction in which the sheet is conveyed by the conveyance roller.

4. The image forming apparatus according to claim 1, wherein the conveyance roller is provided downstream of a reading position at which the sensor reads the image in a conveying direction in which the sheet is conveyed by the conveyance roller.

5. The image forming apparatus according to claim 1, further comprising:

a motor to be controlled based on a speed set value, wherein the controller is configured to determine the speed set value based on the information to control the conveying speed.

6. The image forming apparatus according to claim 1, further comprising:

a motor to be controlled based on a speed set value, wherein the controller is configured to determine the speed set value based on the information so that the conveying speed becomes a predetermined conveying speed.

7. The image forming apparatus according to claim 1, wherein the information is a basis weight of the sheet.

8. The image forming apparatus according to claim 1, further comprising:

a motor to be controlled based on a speed set value, wherein the information is a basis weight of the sheet, wherein the controller is configured to determine, when the conveyance roller conveys a sheet having a first basis weight, a first speed set value to control the conveying speed, and wherein the controller is configured to determine, when the conveyance roller conveys a sheet having a second basis weight that is larger than the first basis weight, a second speed set value that is larger than the first speed set value to control the conveying speed.

9. The image forming apparatus according to claim 1, further comprising:

another conveyance roller configured to convey the sheet through the conveyance path; and a motor to be driven to rotate both the conveyance roller and the another conveyance roller.

10. The image forming apparatus according to claim 1, wherein:

the image forming unit is to be controlled based on an image forming condition, and a measurement result obtained by the sensor is used to generate the image forming condition.

11. The image forming apparatus according to claim 10, wherein the image forming condition is a color profile to be used in image processing.

12. The image forming apparatus according to claim 10, wherein the image forming condition is for adjusting a density of the image to be formed by the image forming unit.

13. The image forming apparatus according to claim 10, wherein the image forming condition is for adjusting a geometrical characteristic of the image to be formed on a sheet.

* * * * *